UNITED STATES PATENT OFFICE.

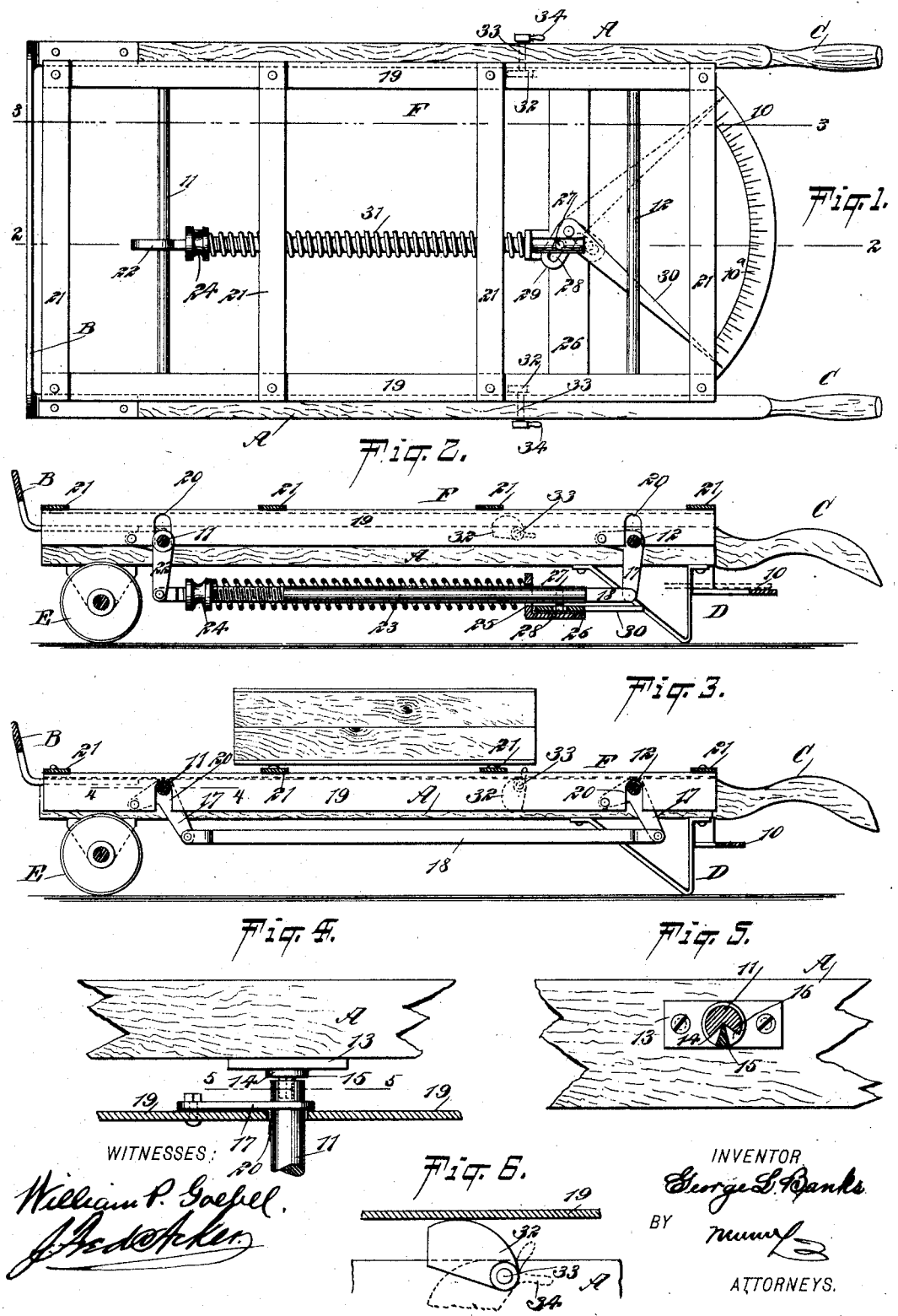

GEORGE L. BANKS, OF COLORADO SPRINGS, COLORADO, ASSIGNOR TO HIMSELF AND ALBERT L. PATTON, OF SAME PLACE.

WEIGHING ATTACHMENT FOR TRUCKS.

SPECIFICATION forming part of Letters Patent No. 630,765, dated August 8, 1899.

Application filed October 1, 1898. Serial No. 692,427. (No model.)

*To all whom it may concern:*

Be it known that I, GEORGE L. BANKS, of Colorado Springs, in the county of El Paso and State of Colorado, have invented a new and Improved Weighing Attachment for Trucks, of which the following is a full, clear, and exact description.

The object of my invention is to provide a weighing attachment which is capable of application to any truck used for the transportation of merchandise; and a further object of the invention is to so construct the weighing attachment that it will be simple, durable, and economic.

Another object of the invention is to provide a means whereby when the weighing attachment is applied to the truck it may virtually be made an integral portion of the truck or be so supported that it will simply receive a load and not register the weight of the same, it being possible to quickly place the attachment in such position that it will automatically register the weight of the load as soon as it is received upon the truck.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of a truck having the improvement applied. Fig. 2 is a longitudinal vertical section thereof substantially on the line 2 2 of Fig. 1. Fig. 3 is a longitudinal vertical section taken practically on the line 3 3 of Fig. 1. Fig. 4 is a horizontal section, drawn on an enlarged scale and taken practically on the line 4 4 of Fig. 3. Fig. 5 is an inner face view of a side member of the truck body, drawn on an enlarged scale and illustrating in transverse section one of the shafts of the attachment and its knife-edge bearings; and Fig. 6 is a longitudinal sectional view, likewise drawn on an enlarged scale, illustrating the means employed for holding the weighing-platform rigid when desired.

A represents the sides of an ordinary truck; B, the nose or lift; C, the handles; D, the rear legs adjacent to the handles, and E the wheels that support the truck at its forward or receiving end. The truck may be of any suitable or ordinary construction and may be braced as occasion may demand.

At the rear portion of the truck or at that portion of the sides adjacent to the handles C a segmental horizontal bar or plate 10 is supported by suitable hangers attached to the inner side faces of the side pieces of the truck or to any other adjacent point on the truck, and the said segmental bar or plate 10 is provided with a scale $10^a$, designating pounds and fractions of a pound.

Two shafts 11 and 12 are journaled transversely in the frame of the truck, the shaft 11 being near the forward end of the truck and the shaft 12 near its rear end. Each shaft is provided with peculiar bearings, (shown best in Figs. 4 and 5,) the bearings being the same at each end of each shaft. Each of said bearings consists of a plate 13, secured to the inner side face of a side bar of the truck-frame, and on each plate 13 a boss 14 is preferably formed of disk-like construction, and from each boss 14 a knife-edge bearing 15 is horizontally projected, each shaft 11 and 12 at its ends having an angular slot 16 produced therein to receive the knife-edge bearings 15, as shown particularly in Fig. 5.

A crank-arm 17 is secured to each shaft 11 and 12 near each end, which crank-arms are of L shape and are in the form of elbow-levers, and the lower ends of the vertical members of the crank-arms at each side of the truck are united by a connecting-bar 18.

The weighing-platform F is located at the upper portion of the truck above the upper faces of the side bars A of the frame. This weighing-platform consists, preferably, of angle side bars 19, one of the members extending over the upper faces of the side bars of the truck-frame, the other member extending downward at the inner faces of the side bars of the truck-frame a suitable distance, and the pendent members of the platform-frame are provided with recesses 20 where the shafts 11 and 12 occur, and the upper or horizontal members of the crank-arms 17 are pivotally connected in any suitable or approved manner with the pendent members of the side bars of the weighing-platform frame. These side bars 19 of the weighing-platform frame are connected by suitable transverse bars 21, placed at desired intervals apart, as shown particularly in Figs. 1, 2, and 3, and the weighing-platform extends from a point near the handles to or near the forward end of the truck-frame.

The forward shaft 11 is provided at its center with a downwardly-extending crank-arm 22, the said crank-arm being pivotally attached to one end of a rod 23, that portion of the rod adjacent to the crank-arm 22 being exteriorly threaded to receive a nut 24. The rear end of the rod 23 is made to slide loosely through an opening 25 in a projection from a cross-bar 26, which extends, preferably, from side to side of the truck-frame at the bottom.

A pin 27 extends from the lower side of the rod 23, and this pin is made to enter a slot 28, made in the head 29 of a pointer 30, the head being at an angle, usually a right angle, to the pointer, and the pointer is pivoted on the cross-bar 26 at a point adjacent to the connection of the pointer with its head, as shown in Fig. 1.

A spring 31 is coiled around the rod 23, and the said spring has bearing against the nut 24 and the extension of the cross-bar 26, through which the rear end of the shaft 23 passes, as is shown in both Figs. 1 and 2. The pointer is adapted to travel over the scale $10^a$, and the spring and nut 24 are adapted to adjust the pointer or to take up any lost motion that may occur. In fact, the spring and the nut are utilized to balance the scale.

Sometimes it may be desirable to use the truck for ordinary purposes, it not being necessary to weigh the material received upon the platform F. In such an event any approved form of locking device may be employed for holding the platform rigidly in its normal position. One form of such device is illustrated in the drawings, particularly in Fig. 6, and consists of cams 32, located below the horizontal members of the sides of the platform, these cams being secured to shafts 33, and the shafts are manipulated by means of handles 34, attached to their outer ends, the shafts extending through the side beams A of the truck-frame. When the cams 32 are in one position, as shown in positive lines in Fig. 6, they prevent the platform from yielding in direction of the truck-frame; but when the cams are in their second position, as shown in dotted lines in Fig. 6, the scale-platform is free to operate the pointer through the medium of its connecting devices.

I desire it to be understood that if in practice it is found desirable the nose or lip B instead of being attached to the frame of the truck may form a portion of the scale-platform. It will be observed that the pendent members of the side bars of the weighing-platform serve to protect from the weather the bearings of the shafts 11 and 12.

Having thus described my invention, I claim as new and desire to secure by Letters Patent—

1. The combination, with a truck, a scale attached to the truck, shafts journaled in the said truck, crank-arms projected from the ends of the shaft, and connecting-bars uniting the crank-arms at each side of the truck, of a crank-arm intermediate of the ends of one of the said shafts, a spring-controlled bar pivotally connected with the intermediate crank-arm, means for regulating the strength of the spring, a pointer adapted to travel over the scale, and an actuating connection between the pointer and said spring-controlled bar, as and for the purpose specified.

2. The combination, with a truck, shafts having knife-edge bearings upon the said truck, crank-arms projected downward from each end of each shaft, connecting-rods uniting the crank-arms at each side of the truck, a crank-arm projected from one of said shafts intermediate of its ends, an adjusting-bar pivotally connected to the intermediate crank-arm, the opposite end of the adjusting-bar being loosely passed through a bearing, a spring surrounding the said adjusting-bar, having engagement with the bearing at the rear end of the bar, and a nut carried by the bar, engaging with the opposite end of the spring, of a platform normally located above the truck, and independent thereof, said platform having connection with the end crank-arms of the said shafts, a stationary scale, and a pointer actuated by said adjusting-bar, as and for the purpose specified.

3. The combination of a body, two rock-shafts mounted thereon, levers fixed to the body, a platform mounted on the levers, a connection between the levers to cause the same to move in unison, an arm fixed to one of the shafts, a rod attached to and reciprocated by the arm, a spring actuating the rod, and a pointer having connection with and driven by the rod.

4. The combination with the body of a truck, of two shafts mounted to rock on the body, levers secured to the shafts, a connection between the levers of each shaft to cause the shafts to rock in unison, a platform having connection with the levers to impart the movement of the platform to the shafts, an arm secured to one of the shafts, a rod moved longitudinally by the arm, a spring actuating the rod, a pointer mounted pivotally on the body portion and having a slot receiving a part on the rod, whereby to drive the pointer from the rod, and a scale carried by the body portion and having the pointer mounted to play thereon.

GEORGE L. BANKS.

Witnesses:
W. M. SANDERS,
V. B. LEONARD.